United States Patent [19]

McLaughlin

[11] 4,421,991
[45] Dec. 20, 1983

[54] WAVE POWERED ELECTRICAL GENERATOR

[76] Inventor: Owen L. McLaughlin, 193 Seneca Cir., Winfield, W. Va. 25213

[21] Appl. No.: 423,862

[22] Filed: Sep. 27, 1982

[51] Int. Cl.³ .............................................. F03B 13/12
[52] U.S. Cl. ...................................... 290/53; 60/499; 60/507; 290/42; 417/333
[58] Field of Search .................... 290/42, 53; 417/330–333; 60/497, 499, 500, 506, 507

[56] References Cited

U.S. PATENT DOCUMENTS

| | | | |
|---|---|---|---|
| 986,740 | 3/1911 | Mobius | 60/499 |
| 1,082,746 | 12/1913 | Hemmenway | 290/42 |
| 3,204,110 | 8/1965 | Masuda | 290/53 |
| 4,110,630 | 8/1978 | Hendel | 290/42 |

Primary Examiner—B. Dobeck
Assistant Examiner—Shelley Wade
Attorney, Agent, or Firm—George J. Neilan

[57] ABSTRACT

Electrical energy is generated from waves in a body of water employing a support member, buoyant vanes connected to a shaft and rotated by the waves, and a generator coupled to the shaft. Each vane has an elongated slot that the shaft extends through. Cooperating gear teeth around the periphery of the slots and on the shaft cause radial movement of the vanes relative to the shaft during the rotation of the vanes.

6 Claims, 4 Drawing Figures

WAVE POWERED ELECTRICAL GENERATOR

FIELD OF THE INVENTION

The present invention relates to apparatus for converting the energy in water waves into electrical power.

BACKGROUND OF THE INVENTION

In recent years, there has been considerable concern regarding future energy needs due to eventual depletion of fossil fuels and to safety problems of nuclear power. Thus there has been renewed interest in research into various devices for converting energy in naturally occurring fluid streams or currents into electrical energy. For example, it has been estimated that there is enough power theoretically recoverable from ocean waves to satisfy present global demand for electricity.

Some prior art wave powered generators have turbine blades or the like designed to be rotated by wave motion. In efforts to reduce back resistance and energy loses on the return path of the blades, some known devices have been proposed with retractable blades. It has also been proposed to employ cup-like blades which have louvers which open to allow fluid flow through the blades during their return cycles of rotation.

SUMMARY OF THE INVENTION

A primary object of this invention is to provide a novel wave powered generator for converting energy in water waves into electrical power.

Another object of this invention is to provide a rotating vane assembly with novel means for reducing resistance to rotation of the vanes and loss of energy during return of the vanes to power generating upper positions.

Briefly, the present invention comprises a bouyant support structure moored in a body of water, a vane assembly for extracting energy from water waves, and a generator coupled to one or more shafts rotated by the vane assembly. The vane assembly includes a plurality of vanes connected to respective ones of a series of horizontal shafts. The vanes are positioned so that in upper position they are struck by water waves that cause the shafts to rotate due to rotation of the vanes and to transmit energy to the generator. The vanes which are hollow and buoyant have elongated slots through which the respective shaft extends. Gear teeth around the periphery of the slots engage teeth on gears connected to the shafts. The slots are wider than the diameter of the gears on the shafts so that the shaft gears engage teeth on only one side of the slot. After an initially upright vane end is rotated downwardly by wave action to allow the horizontal; buoyancy causes the other end of the vane to move upwardly into position to be impacted by a subsequent wave to repeat the cycle. While a vane is moving upwardly due to its buoyancy, the gears mesh without loss of energy.

Other objects, features and advantages of the invention will become more apparent as this description proceeds.

DETAILED DESCRIPTION OF THE INVENTION

Figure 3:
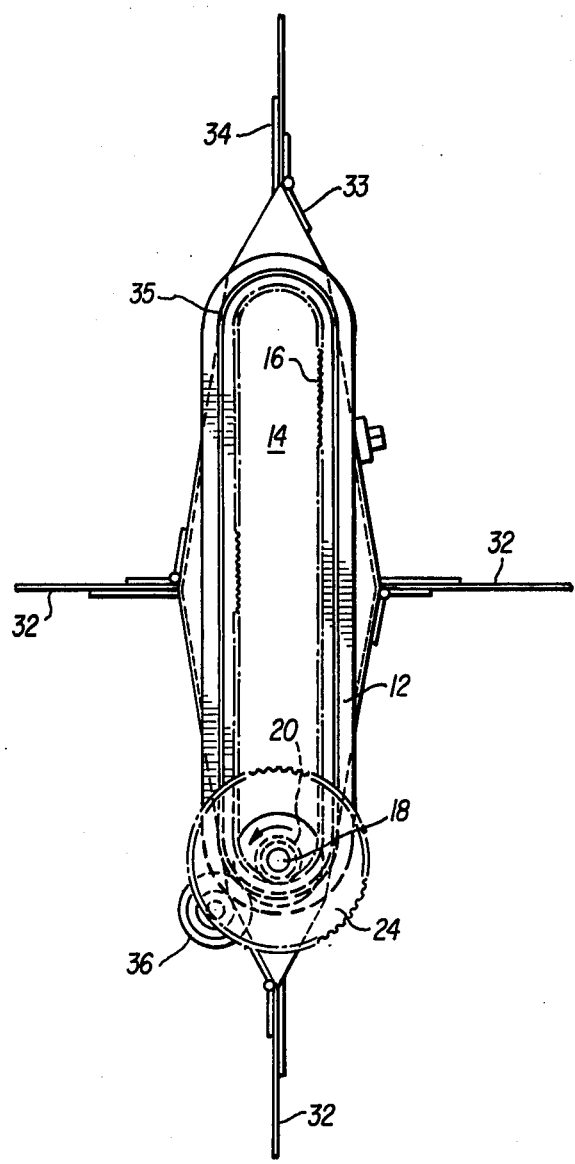
FIG. 3 is an elevational view of one of the vanes of the invention showing associated gears.
Figure 4:
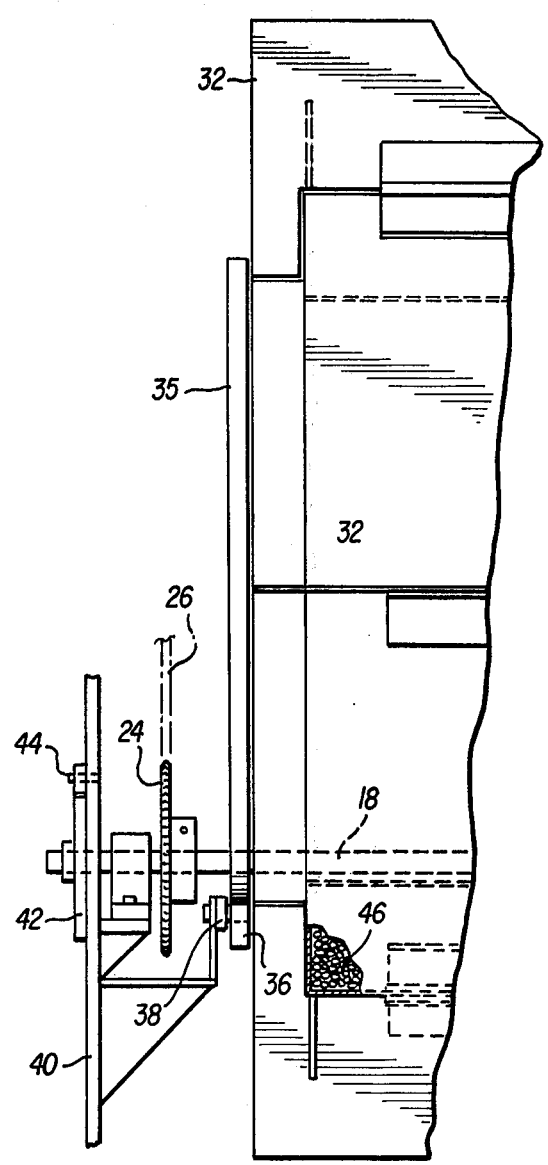
FIG. 4 is a view on an enlarged scale of a portion of FIG. 1.

Referring to the drawings, reference numeral 10 generally designates a wave powered electrical generating apparatus in accordance with a presently preferred embodiment of the invention. The apparatus includes a plurality of rotatable, hollow, buoyant vanes 12. As best seen in FIG. 3, the vanes have elongaed longitudinal slots 14 which have gear teeth 16 around their peripheries which form an internal gear. A shaft 18 extends through each vane and has a spur gear 20 which engages the gear teeth 16. Shafts 18 are coupled to generators 22 via sprockets 24 on shafts 18, roller chains 26, and a sprocket 28 on shaft 30.

The vanes are buoyant, airtight hollow metal bodies. At rest, the vanes are generally upright with an upper end extending above the surface of the water. Flat arcuate fins 32 are preferably attached to each vane 90 degrees from each other for the purpose of increasing the surface area exposed to the waves and to increase the efficiency of utilization of wave energy. Hinges 33, which are preferably single acting ball bearing steel hinges with adjustable tension, bias the fins towards extended positions in contact with stops 34.

Endless tracks 35 are welded or otherwise suitably secured at each side of the vanes 12. Each track has a V-shaped outer surface and is supported by and rotates upon a pair of guide wheels 36. The guide wheels are rotatably mounted via bushing 38 upon a support frame 40. The tracks stabilize the vanes during rotation and eliminate excessive side-to-side movement and binding. In addition, the tracks enable the vanes to rotate downwardly without the internal gear teeth 16 inadvertently becoming disengaged from spur gear 20.

A ratchet 42 on shaft 18 and a pawl 44 on support frame 40 limit the vanes and shaft 18 to rotation in one direction, counterclockwise as seen in FIG. 3.

The width of slots 14, i.e., the transverse distance between the outer surfaces of teeth 16 on opposite sides of the slot, is greater than the outer diameter of spur gear 20. Accordingly, at any given time the spur gear is driven by gear teeth on only one side of slot 14.

In operation, assuming that a particular vane 12 is initially substantially upright; the cycle commences with an oncoming wave impacting upon the surface of the upper end of the vane. Transfer of energy from the wave to the vane causes the vane to rotate downwardly. The gear teeth 16 meshed with spur gear 20 cause a corresponding rotation of shaft 18. This rotation of the vane continues until the vane rotates to below the horizontal. At this point a plurality of spherical weights 46 in the hollow vane roll downwardly into the end of the vane which had initially been up at the surface of the water. This causes an abrupt shift in the center of gravity of the vane. With the gears still engaged, the buoyancy of the light end of the vane assists in causing this end to swing up breaking the surface of the water, and the vane comes to an upright position to complete the cycle.

Figure 1:
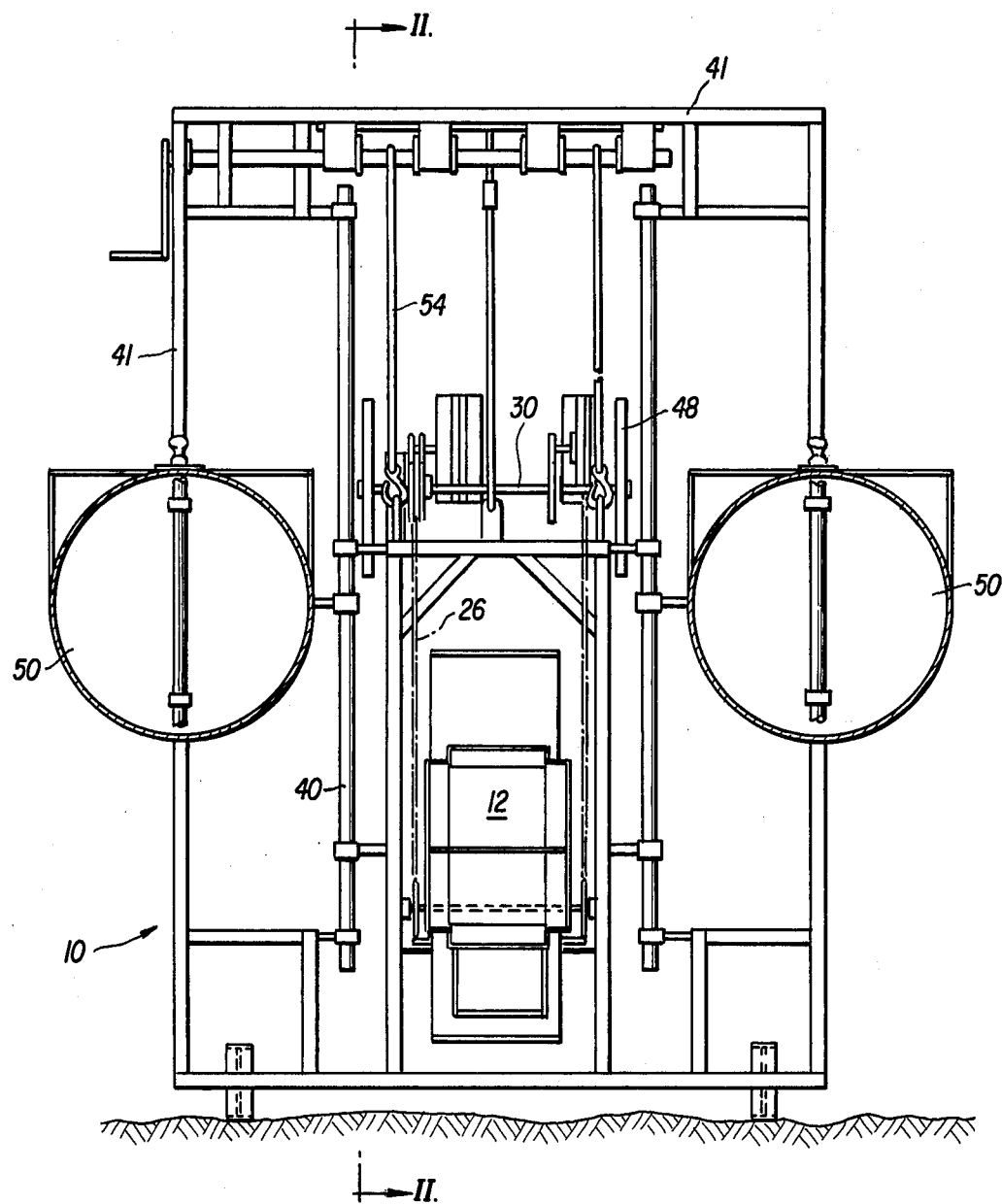
FIG. 1 is an end view of one embodiment of the invention.
Figure 2:
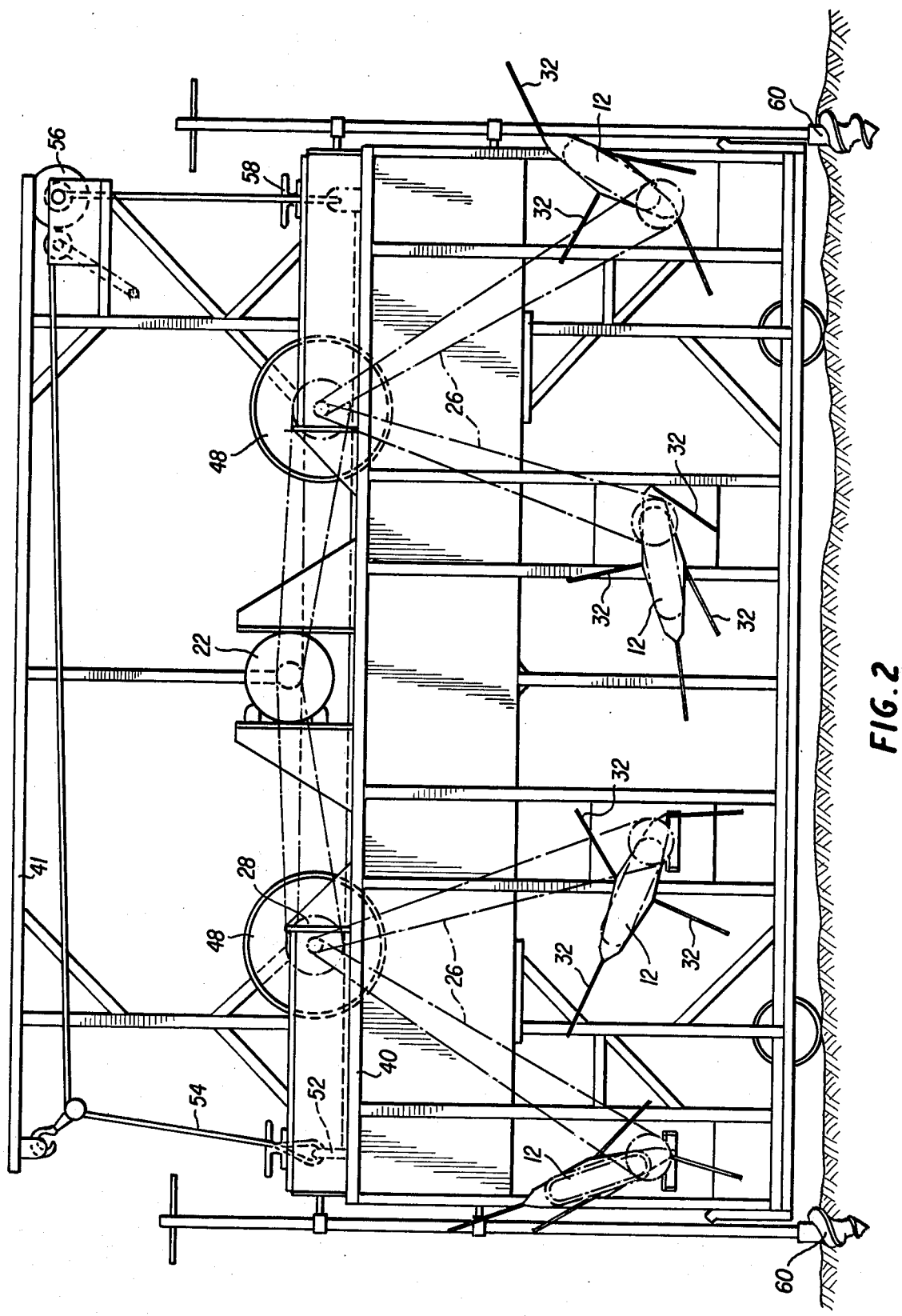
FIG. 2 is a vertical cross-sectional view taken on the line II—II of FIG. 1.

As seen in FIG. 2, the submerged fins 32 are deflected against the bias of hinges 33 to reduce resistance to rotation. When a given vane approaches the upright position, the tension in hinge 33 moves the fin 32 to its extended position against stop 34 to present its maximum surface for contact with the next wave.

Power is transmitted from shafts 18 to the generators 22 by roller chains 26. Flywheels 48 at the ends of shafts 30 compensate for the periodicity of the waves and make rotation of shafts 30 more uniform.

In lieu of spherical weights 46, a sliding weight in a track or a suitable non-corrosive liquid filling part of the vane might be employed to shift the center of gravity of the vanes.

Floats such as hollow tanks 50 are attached to an upper support frame 41 to provide buoyancy for the apparatus. The support frame 40 which carries the vanes 18 is vertically adjustable relative to the upper support frame 41 via lugs 52 on frame 40, cable 54, and a winch 56 which is attached to upper support frame 41. Thus the depth of the vanes in the water may be adjusted.

The apparatus may be anchored in place by suitable means, such as cleats 58 to which ropes or cables might be attached. In shallow water, augers 60 attached to support frame 40 may be imbedded in the ground beneath the apparatus.

The size and shape of the vanes and fins may be varied, e.g., depending upon the normal wave configurations of a given location. Preferably the vanes are positioned so that the principal incident wave direction is at right angles to shafts 18, in order to obtain maximum energy transfer to the vanes. If desired, a plurality of vanes may be provided on each shaft 18. In such case, the vanes on each shaft could be fixed relative to each other at different angular orientations to allow more consistent rotation of the shafts.

I claim:

1. Apparatus for generating electrical energy from fluid waves comprising at least one hollow, buoyant vane movable by the waves, each vane having an elongated slot, a shaft connected to said vane and rotated by movement of said vane, gear means disposed in said slot and connected to said shaft to enable relative longitudinal movement of said shaft and vane during rotation of said vane, an electrical generator, coupling means connecting said shaft to said electrical generator, and weighting means inside said vane and movable to vary the center of gravity of said vane during rotation of said vane.

2. Apparatus according to claim 1, further cmprising fins attached to said vane to increase the external surface area of said vane.

3. Apparatus for generating electrical energy from fluid waves comprising at least one vane movable by the waves, each vane having an elongated slot, a shaft extending through said slot and rotated by movement of said vane, gear means disposed in said slot and connected to said shaft to enable relative longitudinal movement of said shaft within said slot during rotation of said vane, an electrical generator, coupling means connecting said shaft to said electrical generator, a buoyant support member, said shaft being connected to said support member beneath the surface of a body of water and disposed in a generally horizontal position, and means to adjust the position of said support member relative to the surface of the water.

4. Apparatus according to claim 1, wherein said gear means include gear teeth disposed around the periphery of said slot and a spur gear connected to said shaft and meshing with said gear teeth.

5. Apparatus according to claim 4, wherein said spur gear has an external diameter less than the distance between teeth on opposite sides of said slot whereby said spur gear operatively engages teeth on only one side of said slot.

6. Apparatus according to claim 5, further comprising a support member supporting said shaft, and guide wheel means connected to said support member to maintain each vane in alignment during rotation.

* * * * *